(12) United States Patent
Jones

(10) Patent No.: US 9,440,550 B2
(45) Date of Patent: Sep. 13, 2016

(54) BATTERY USE OPTIMIZATION UTILIZING A RESERVE FLEET

(71) Applicant: Philadelphia Scientific LLC, Montgomeryville, PA (US)

(72) Inventor: Duncan Jones, Manchester (GB)

(73) Assignee: Philadelphia Scientific LLC, Montgomeryville, PA (US)

( * ) Notice: Subject to any disclaimer, the term of this patent is extended or adjusted under 35 U.S.C. 154(b) by 9 days.

(21) Appl. No.: 14/346,830

(22) PCT Filed: Sep. 24, 2012

(86) PCT No.: PCT/US2012/056849
§ 371 (c)(1),
(2) Date: Mar. 24, 2014

(87) PCT Pub. No.: WO2013/044206
PCT Pub. Date: Mar. 28, 2013

(65) Prior Publication Data
US 2014/0232340 A1 Aug. 21, 2014

Related U.S. Application Data

(60) Provisional application No. 61/538,453, filed on Sep. 23, 2011, provisional application No. 61/665,927, filed on Jun. 29, 2012.

(51) Int. Cl.
*H02J 7/00* (2006.01)
*B60L 11/18* (2006.01)
*G06Q 10/06* (2012.01)

(52) U.S. Cl.
CPC ............ *B60L 11/185* (2013.01); *B60L 11/184* (2013.01); *G06Q 10/06* (2013.01); *H02J 7/0027* (2013.01); *B60L 2200/30* (2013.01); *B60L 2200/42* (2013.01); *Y02T 10/7005* (2013.01); *Y02T 10/7072* (2013.01); *Y02T 90/121* (2013.01); *Y02T 90/128* (2013.01); *Y02T 90/14* (2013.01);
(Continued)

(58) Field of Classification Search
CPC ............ B60L 2240/72; B60L 11/1824; H02J 7/0027
USPC ........................................................ 320/109
See application file for complete search history.

(56) References Cited

U.S. PATENT DOCUMENTS

| | | |
|---|---|---|
| 9,056,556 B1 * | 6/2015 | Hyde et al. |
| 9,079,505 B1 * | 7/2015 | Hyde et al. |
| 2010/0191585 A1 * | 7/2010 | Smith .............................. 705/13 |

(Continued)

OTHER PUBLICATIONS

Supplementary European Search Report and European Search Opinion dated Mar. 20, 2015 in related EU application 12833693.0.

*Primary Examiner* — Suchin Parihar
(74) *Attorney, Agent, or Firm* — Fox Rothschild LLP

(57) ABSTRACT

A system for the management of a fleet of battery powered vehicles using a paradigm of a reserve pool of vehicles as opposed to a reserve fleet of batteries. In this system, a reserve pool of vehicles is always maintained in a ready state such that vehicles being returned with depleted batteries may be replaced with a vehicle having a fully-charged battery. The system maintains a balance between reserve fleet size and charging time (and therefore the life of the batteries) to provide optimal performance and cost savings. The system has the added advantages of capital efficiency in that that the time and labor required to change batteries, and the need to maintain extra batteries is eliminated.

15 Claims, 3 Drawing Sheets

(52) U.S. Cl.
CPC ............. *Y02T 90/163* (2013.01); *Y02T 90/169* (2013.01); *Y04S 30/14* (2013.01)

(56) References Cited

U.S. PATENT DOCUMENTS

| | | | |
|---|---|---|---|
| 2010/0211340 A1* | 8/2010 | Lowenthal et al. | 702/63 |
| 2011/0040440 A1* | 2/2011 | de Oliveira et al. | 701/30 |
| 2011/0316548 A1* | 12/2011 | Ghantous et al. | 324/427 |
| 2012/0271723 A1* | 10/2012 | Penilla et al. | 705/16 |
| 2012/0280653 A1* | 11/2012 | Prosser et al. | 320/109 |
| 2012/0303397 A1* | 11/2012 | Prosser | 705/7.12 |
| 2012/0330494 A1* | 12/2012 | Hendrix et al. | 701/29.3 |
| 2013/0179007 A1* | 7/2013 | Dalum | 701/2 |
| 2014/0028254 A1* | 1/2014 | Shane et al. | 320/109 |
| 2014/0232340 A1* | 8/2014 | Jones | 320/109 |
| 2014/0350716 A1* | 11/2014 | Fly et al. | 700/215 |
| 2015/0191162 A1* | 7/2015 | Dao et al. | 320/107 |
| 2015/0239365 A1* | 8/2015 | Hyde et al. | 320/109 |

* cited by examiner

BATTERY USE OPTIMIZATION UTILIZING A RESERVE FLEET

RELATED APPLICATIONS

This application claims the benefit of U.S. Provisional Application 61/538,453, filed Sep. 23, 2011, and entitled "Battery Use Optimization Utilizing a Reserve Fleet" and U.S. Provisional Application 61/665,927, filed Jun. 29, 2012, and entitled "Method of Selecting a Battery from a Fleet of Batteries".

BACKGROUND

Many business operations have facilities that utilize fleets of battery powered vehicles. For example, a warehouse may use a fleet of fork lift trucks to move goods into and out of the warehouse. In some cases, such facilities operate twenty-four hours a day. In such scenarios, battery management to keep batteries charged and vehicles moving becomes a difficult problem.

In the typical warehouse scenario, a worker checks out a vehicle and utilizes that vehicle for his entire shift. As the vehicle must also be used for the next shift, the battery must be changed to allow the vehicle to continue to operate, while the original battery is charged off-line. As a typical charge can take up to 8 hours, to keep a vehicle running for three 8-hour shift requires up to three batteries. In an optimized battery change scenario, it is possible to use less batteries by having the operatives only change batteries when the indicator on the truck indicates a change is required.

This model of management of the batteries is inefficient and expensive. In addition to the cost of the multiple batteries required for each vehicle, there is the additional cost of the equipment and labor required to change the batteries and the lost time while the batteries are being rotated.

To minimize the battery changing problem, some facilities have been moving away from charging the batteries at the end of the shift and moving to "rapid charging" of the batteries. Rapid charging occurs when an operator of one of the vehicles takes a break and connects to a very high rate charger for anywhere from fifteen minutes to half an hour. This process will put enough energy back into the battery such that it can run the vehicle until the next time the operator takes a break, or until the end of the operator's shift. While this method eliminates spare batteries, the rapid charge method has several draw backs. First, it is inefficient from an energy usage point of view, with about 75% of the energy going into the battery and about 25% of the energy being wasted as heat. In addition, the rapid charging tends to shorten the life of the battery dramatically. Using the battery changing scenario, one may expect to get up to seven years life out of a battery, but in a rapid charging scenario, the life expectancy of a battery may be reduced to as little as three years. In addition, it is necessary to manage the break time of the operators by staggering the break time such that a charger is always available when the operator is on break.

Therefore, it would be desirable to provide a new method of managing the battery charging to (a) eliminate battery changing and (b) reduce the problems involved with fast charging.

DESCRIPTION OF THE INVENTION

The system and method of the present invention involves a system for managing the use and charging of vehicles utilizing batteries as their sole power source. The invention utilizes a system described in parent provisional 61/665,927 for optimizing the selection of batteries from a fleet of batteries. In that system, depleted batteries are removed from a vehicle for charging and a charged battery is picked from a fleet and installed on the vehicle. U.S. Provisional Application 61/665,927, which describes the battery fleet optimization system and method, is incorporated herein in its entirety.

Figure 3:
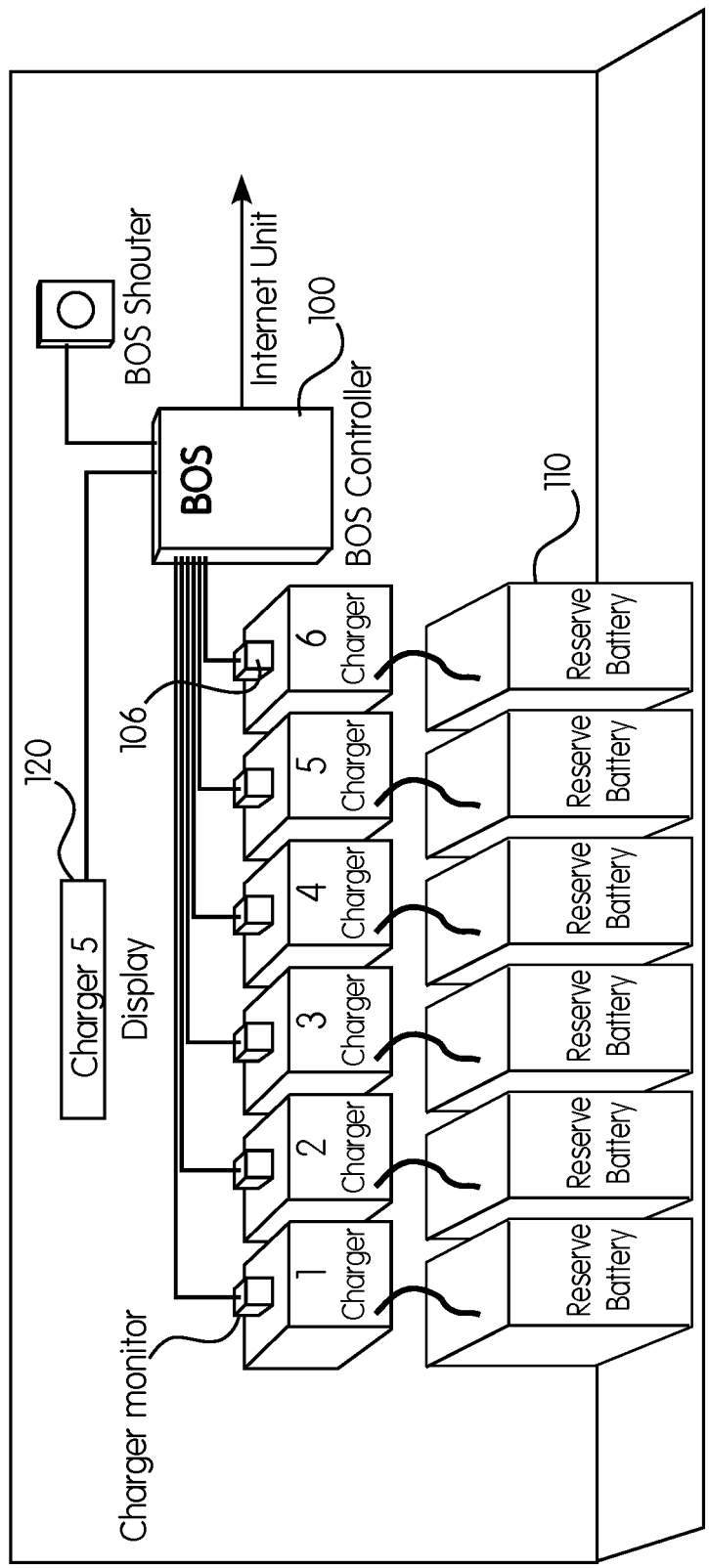
FIG. 3 is a schematic drawing showing the charging system of the present invention charging a series of batteries.

The present invention modifies the paradigm of maintaining a fleet of batteries, shown as reference number 110 in FIG. 3, and instead requires the maintenance of a reserve pool of vehicles in addition to the core fleet requirement. When an operator gets the indication that the battery in his vehicle is low, the vehicle is taken to a charging area for all vehicles and is parked and connected for charging. Batteries are not removed from a vehicle for charging, but instead remain with the vehicle. The system then tells the operator which truck to take next, based on several factors which are managed by the system and which may be used to optimize the usage of the vehicles and the batteries. The operator then proceeds to the indicated vehicle and takes that vehicle. This system is shown schematically in FIG. 1. By comparing the operational time of the vehicle to the charge time, the reserve fleet size can be calculated to ensure there is always a fully charged reserve vehicle available when required. It would be expected that some vehicles in the reserve pool would be fully charged, while others would be still charging.

The system eliminates the need to have spare batteries available for each vehicle by shifting the operational paradigm from a battery reserve to a vehicle reserve. It has been found that the elimination of the costs of the extra batteries, the labor to change the batteries and the battery changing equipment, as well as energy savings and extended battery life from eliminating the quick charging of batteries exceeds the cost of the reserve vehicle fleet. In addition, the inclusion of addition vehicles as a reserve fleet will tend to reduce the usage of the main fleet, thereby increasing the operational lifetime of all vehicles.

It has also been found that utilizing faster then standard eight hour charge will reduce the size of the reserve fleet. In one warehousing example, a reserve fleet of about twenty percent of the core fleet size is achievable with a 4-5 hour charging time. In a typical warehouse application the cost of the increase in number of trucks for the reserve fleet would be only 15%-20% of the total cost of operating a typical battery changing room system over the 7 year life expectancy of the trucks. In this system, there is a trade-off between size of the reserve fleet and charging time. Utilizing a shorter charging time will require the maintenance of a smaller reserve fleet, but will shorten the life of the batteries somewhat. A longer charge time will extend the life of the batteries, but will require a larger reserve fleet. As such, there is an optimum point in this tradeoff for each facility.

The system can be optimized through the use of currently existing systems. The first existing system resides on the actual battery and provides operational information regarding the battery, such as remaining life, usage time, etc.

Figure 2:
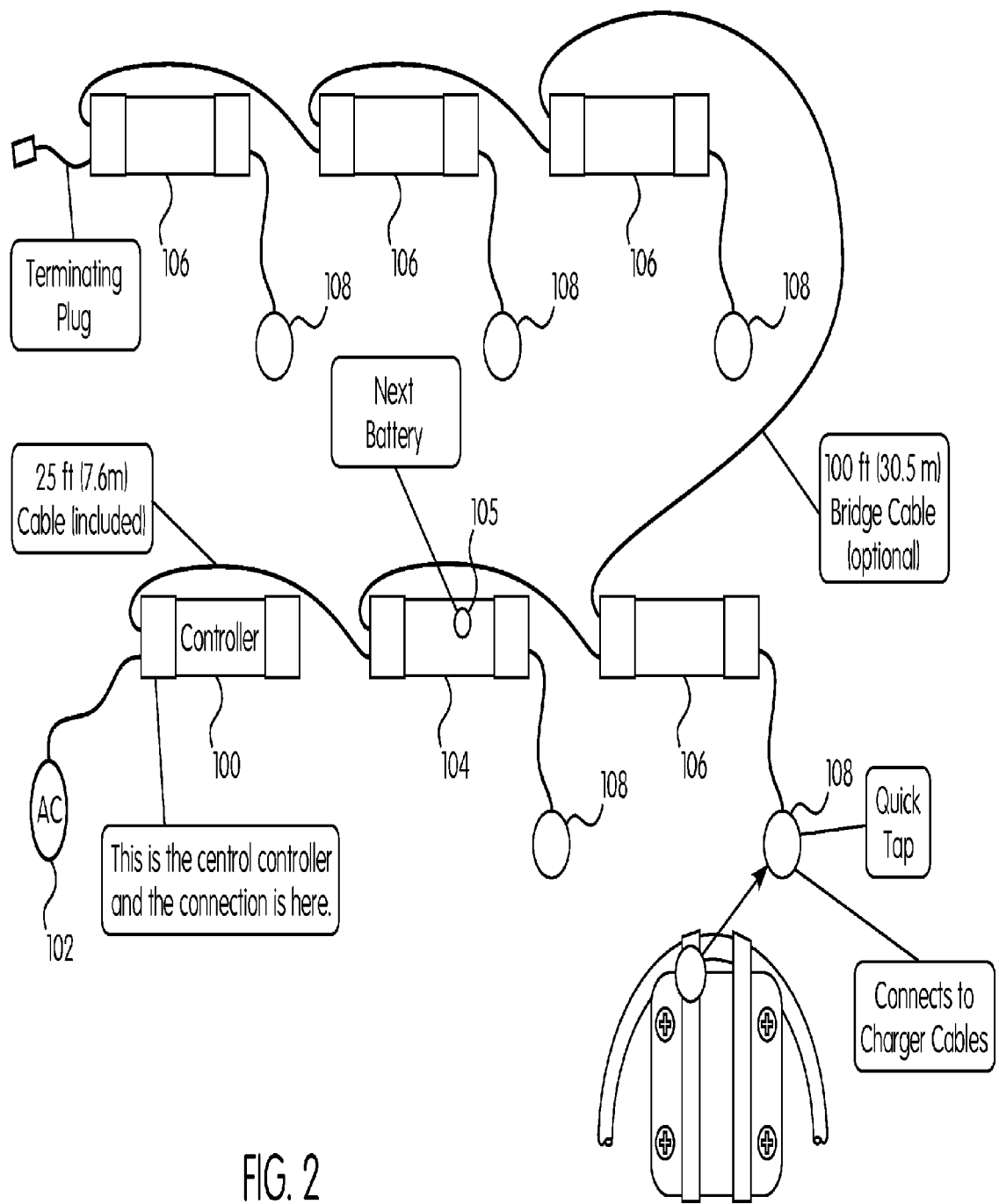
FIG. 2 is a schematic showing the hardware topology of the charging system utilized by the present invention.

The second system is a charger management system which is coupled to each charger and which monitors the chargers and can indicate, based upon several criteria, which battery is ready for operation. This system is shown in FIGS. 2 and 3, and consists of a sentinel unit 106 attached to each charger via a tap 108. Each sentinel is capable of sending the charging status information for each battery 110 to a central controller 100. In addition, the sentinels are also capable of showing a status locally, as shown with an LED on sentinel 104 in FIG. 2 and also as shown as display 120 in FIG. 3, which indicates the next battery to be placed into service, Although the system of the present invention is not necessarily dependant upon the usage of the battery monitoring and charge monitoring systems, the use of the system of the present invention can be optimized through the use of those existing systems.

Vehicles are queued for use after charging using any number of factors related to both the batteries and the vehicles themselves. For instance, the vehicles may simply be placed in a FIFO queue in order of charge completion. Other factors, such as time the vehicle has been in use, may be used to ensure that usage of the vehicles is spread out evenly among all vehicles in the fleet, including the reserve fleet.

As an example of the system, a distribution center which runs 24 hours will have a large fleet of forklift trucks which are specifically developed for the picking orders. It would not be uncommon for such a center to have up to 100 or more trucks busy operating within the distribution center. The trucks are in continuous operation so they will eventually use more energy than the battery can store.

Figure 1:
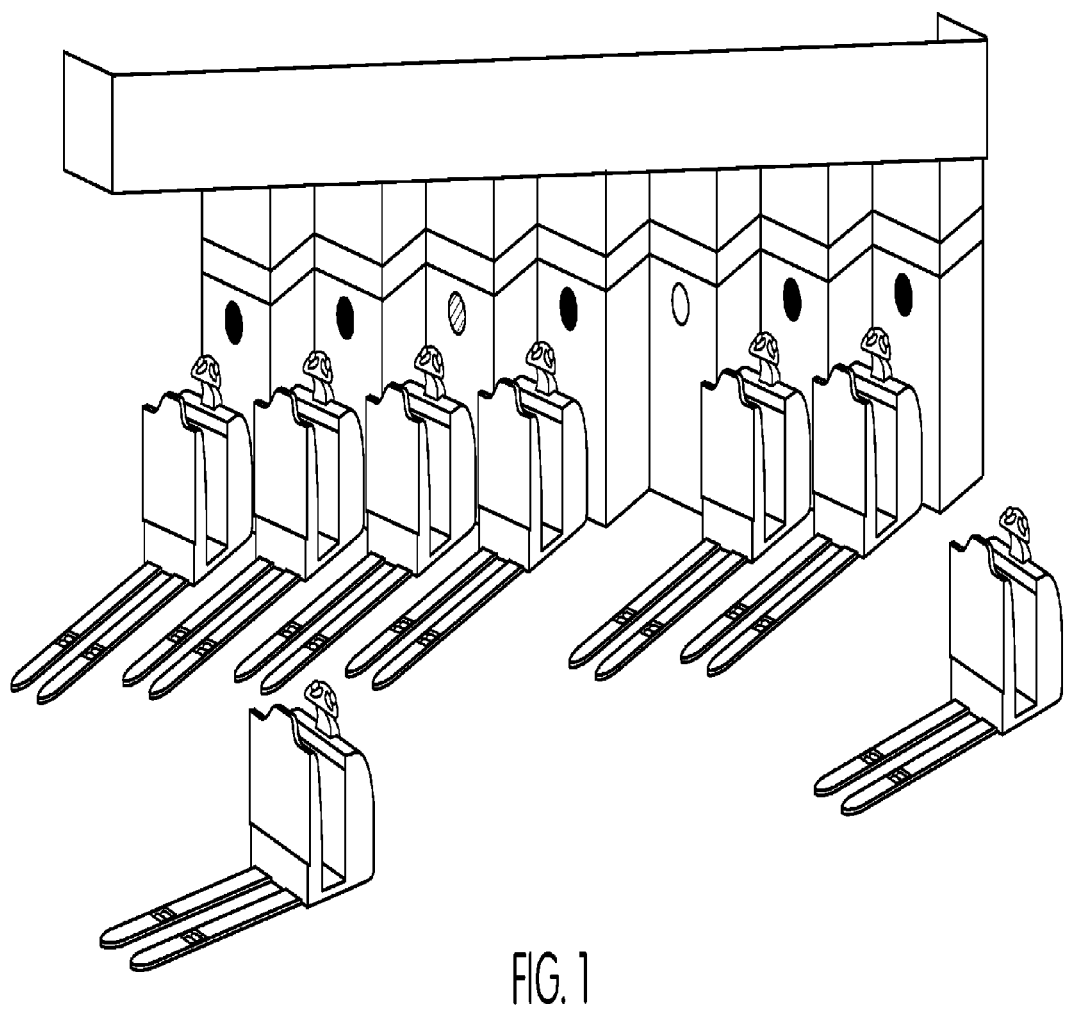
FIG. 1 is a schematic showing a typical charging room with charging stations configured to charge batteries connected to vehicles.

The fleet reserve/rotation model of the present invention avoids the negatives of conventional methods of dealing with a continuous truck use distribution center. In accordance with this invention, a pool of reserve trucks is parked in the charging room. When the operator needs a new truck, he parks in an available charging slot, as shown in FIG. 1, and then the system indicates which truck should be selected next. A reserve pool of trucks is parked in the charging area and faster than standard 8 hour chargers may be used. Slower charging will raise the size of the necessary reserve fleet, while faster charging reduces size of the reserve fleet. The system and method of the present invention is used to manage the truck exchange when the battery on a truck is depleted.

This system and method provides many advantages over the prior art systems. First, the entire process of battery changing is eliminated, providing a savings in time, labor and capital. The need for purchase and maintenance of battery changing equipment is eliminated, as is the need to purchase the reserve fleet of batteries. In addition, the rapid charge often employed to re-charge batteries during employee breaks is eliminated, thus extending the life of the batteries. Instead, an energy-efficient charge rate can be used that will eliminate battery stratification, as batteries will be allowed to fully charge before being used.

The presence of a reserve fleet will also extend the overall life of the entire fleet by a time period approximately equal to the size of the reserve fleet. For example, if a reserve fleet of 20% is maintained, it can be expected that the life of the overall fleet will also be extended by approximately 20%.

The system of the present invention can also:
provide for the even usage of vehicles in the fleet, and, as a result, even usage of the batteries in the fleet;
provide statistical information, based on an analysis of use, for increasing or decreasing the size of the reserve fleet, based on the ability of the system to maintain a queue of fully-charged vehicles;
provide an analysis of the trade-off between battery charge time (and thus battery life) and the size of the necessary reserve fleet; and
maximize charging time for each battery, thereby extending the average life of the battery fleet.

I claim:

1. In an environment having a fleet of battery-powered vehicles, a system comprising:
a plurality of battery charging stations configured to charge batteries connected to said battery-powered vehicles;
a central monitoring facility, including a processor, connected to each of said battery charging stations, for monitoring the charge state of each battery; and
software, running on said processor, said software performing the functions of
accepting vehicles having depleted batteries for charging;
maintaining a queue of vehicles ready for deployment; and
charging said vehicles using a charge rate sufficient to maintain said approximate percentage of queued or charging vehicles.

2. The system of claim 1 wherein said software performs the further function of providing a statistical analysis of charge rate and usage to provide recommendations regarding the size of the overall fleet.

3. The system of claim 1 wherein vehicles are added to said queue of vehicles ready for deployment in a manner which provides even use of individual vehicles in the fleet.

4. The system of claim 1 wherein said software performs the further function of monitoring opportunity charging and providing warnings when the use of opportunity charging exceeds a pre-set threshold.

5. The system of claim 1 wherein said software performs the further function of monitoring the size of the reserve fleet and providing warnings when the reserve fleet falls below a pre-set threshold.

6. In an environment having a fleet of battery-powered vehicles, a system comprising:
a plurality of battery charging stations configured to charge batteries connected to said battery-powered vehicles;
a central monitoring facility, including a processor, connected to each of said battery charging stations, for monitoring the charge state of each battery
software, running on said processor, said software performing the functions of
maintaining a pre-determined percentage of vehicles in said fleet as a reserve fleet ready for deployment;
accepting in-use vehicles having depleted batteries for charging;
selecting a vehicle from said reserve fleet for deployment when an in-use vehicle is returned for charging; and
charging said vehicles using a charge rate sufficient to maintain said pre-determined percentage of vehicles in said reserve fleet.

7. The system of claim 6 wherein said software performs the further function of providing a statistical analysis of charge rate and usage to provide recommendations regarding the size of the overall fleet.

8. The system of claim 6 wherein vehicles are selected for deployment in a manner which provides even use of individual vehicles in the fleet.

9. The system of claim 6 wherein said software performs the further function of monitoring opportunity charging and providing warnings when the use of opportunity charging exceeds a pre-set threshold.

10. The system of claim 6 wherein said software performs the further function of monitoring the size of said reserve fleet and providing warnings when said reserve fleet falls below a pre-set threshold.

11. In an environment having a fleet of battery-powered vehicles, a system comprising:
- a plurality of battery charging stations configured to charge batteries connected to said battery-powered vehicles;
- a central monitoring facility, including a processor, connected to each of said battery charging stations, for monitoring the charge state of each battery;

further comprising:
- software, running on said processor, said software performing the functions of
- accepting vehicles having depleted batteries for charging and maintaining a queue of vehicles ready for deployment, whereby the charging vehicles and said queue of vehicles are maintained in addition to a core fleet as a reserve fleet;
- when a vehicle is parked and connected for charging, indicating which vehicle is to be taken next from said reserve fleet; and
- charging said vehicles using a charge rate sufficient to maintain the size of said reserve fleet as an approximate percentage of the size of said core fleet or of the size of the overall fleet consisting of said core fleet and said reserve fleet.

12. The system of claim 1 wherein said software performs the further function of providing a statistical analysis of charge rate and usage to provide recommendations regarding the size of the overall fleet.

13. The system of claim 1 wherein vehicles are added to said queue of vehicles ready for deployment in a manner which provides even use of individual vehicles in the fleet.

14. The system of claim 1 wherein said software performs the further function of monitoring opportunity charging and providing warnings when the use of opportunity charging exceeds a pre-set threshold.

15. The system of claim 1 wherein said software performs the further function of monitoring the size of said reserve fleet and providing warnings when said reserve fleet falls below a pre-set threshold.

* * * * *